US006092730A

United States Patent [19]

Ehara

[11] Patent Number: 6,092,730

[45] Date of Patent: Jul. 25, 2000

[54] APPARATUS FOR COUNTING AND DISPENSING SHEET OBJECTS

[75] Inventor: Takashi Ehara, Hachioji, Japan

[73] Assignee: Asahi Seiko Co., Ltd., Tokyo, Japan

[21] Appl. No.: 09/078,529

[22] Filed: May 13, 1998

[51] Int. Cl.[7] .................................................... G06K 13/00

[52] U.S. Cl. ............................................ 235/475; 399/375

[58] Field of Search ............................ 235/475, 476–479, 235/486, 487; 399/375, 372; 355/316, 309

[56] References Cited

U.S. PATENT DOCUMENTS

| | | | |
|---|---|---|---|
| 4,357,126 | 11/1982 | Kidd et al. . | |
| 4,363,584 | 12/1982 | Kokubo . | |
| 4,470,590 | 9/1984 | Ariga et al. . | |
| 5,499,091 | 3/1996 | Kasiwabara et al. | 355/319 |
| 5,580,045 | 12/1996 | Matsumoto et al. | 271/298 |
| 5,649,274 | 7/1997 | Honda et al. | 399/375 |

FOREIGN PATENT DOCUMENTS

| | | |
|---|---|---|
| 2096987 | 11/1993 | Canada . |
| 0395047A2 | of 1990 | European Pat. Off. . |
| 0581102A1 | of 1994 | European Pat. Off. . |
| 3624346 | 1/1988 | Germany . |
| 19500899 | of 1996 | Germany . |
| 6-32514 | 2/1994 | Japan . |
| 2309811 | 8/1997 | United Kingdom . |
| 9002389 | 3/1990 | WIPO . |

*Primary Examiner*—Thien M. Le
*Attorney, Agent, or Firm*—Quirk & Tratos

[57] ABSTRACT

An apparatus is set forth for counting and discharging sheet objects such as currency notes or the like. The apparatus has a housing containing a drum. The drum has an outer periphery spaced from the housing to define a chamber to temporarily receive an assembled bundle of objects. A compartment is provided in the drum to serially receive objects as they are counted and the drum rotates to serially discharge the counted objects from the compartment into the chamber to form the bundle. The bundle of a predetermined number of objects is then removed from the housing.

19 Claims, 21 Drawing Sheets

APPARATUS FOR COUNTING AND DISPENSING SHEET OBJECTS

FIELD OF THE INVENTION

The present invention relates to an apparatus for counting and discharging sheet objects such as bank notes, currency, tickets or other pliable sheet objects.

BACKGROUND OF THE INVENTION

A discharge apparatus of a bank note is disclosed in Japanese application Serial Number 6-32514. The apparatus has a transfer mechanism for the bank note, a temporary storage apparatus of a bank note and a controller processor. The temporary storage apparatus consists of a drum which has an endless belt. The endless belt moves one sheet of the bank note to the drum and the bank note is stored in the form of a bundle. The drum turns one 360° revolution and the bank note is supplied from a transfer apparatus and stacked on the drum surface sequentially to form bundles. If the drum is rotated in the opposite direction, the stacked bundle is returned to the transfer apparatus.

The aforementioned apparatus is complicated.

It is an object of the present invention to provide an apparatus for counting and dispensing a sheet object which does not require the complicated design and mechanism of the type described above.

It is a further object of the present invention to provide an apparatus which is simple, counts the sheet objects supplied thereto readily and discharges them quickly.

It is a further object of the present invention to provide a simple apparatus which can count and dispense sheet objects from a large inventory quickly and reliably.

SUMMARY OF THE INVENTION

There is, therefore, set forth according to the present invention a count and discharge apparatus for sheet objects including a housing and a cylindrical drum disposed in the housing for rotation. The drum has an outer peripheral spaced from the housing to define a chamber to receive at least one sheet and preferably a bundle of sheets serially fed thereto for removal from the housing. The drum also includes a circumferential compartment opening to the periphery and adapted to receive the sheet object. Means are provided for feeding a sheet object into the compartment for counting and discharge. Counting means count the sheet as it is fed into the compartment. After the counted sheet has been fed into the compartment, means are provided for rotating the drum in a first direction and a stop is disposed in the housing to engage the sheet object temporarily stored in the compartment to urge the sheet object from the compartment into the chamber for removal from the housing.

In further aspects of the present invention, a controller is provided to control the feeding means and counting means to serially locate sheet objects of a selected number in the chamber, e.g. a stack of ten currency notes. A protrusion provided on the periphery of the drum presses the sheets serially fed into the chamber into the bundle.

In still further aspects of the present invention, in the event that the counting means counts two sheet objects incorrectly fed simultaneously into the compartment, means are provided to withdraw the sheet objects from the compartment and move them to a tray for storage thereof.

In still a further aspect of the present invention, a finger is provided at the periphery of the drum for extension therefrom. When a selected number of sheet objects have been stacked in the bundle within the chamber, the controller controls the drum to rotate in a reverse direction and the finger extends to urge the stacked sheet object bundle from the chamber for discharge from the housing. In one aspect, the finger may first engage the bundle and thereafter retract to trap an edge of the bundle against the periphery of the drum until the bundle is forcibly removed therefrom.

As can be appreciated, as the sheet objects are serially fed from an inventoried stack of sheet objects, they are fed into the compartment and counted and the drum rotates to serially feed the counted sheet objects into the chamber to form a bundle of a pre-determined number. Thereafter, the bundle may be removed or discharged in the manner described above by reverse rotation of the drum.

BRIEF DESCRIPTION OF THE DRAWINGS

These and other features and advantages will become appreciated as the same becomes understood with reference to the specification, claims and drawings wherein:

DESCRIPTION

Turning to the drawings, the apparatus is shown and includes a base 99 which supports two upstanding and spaced sidewalls 10, 11 which provide support for the components as hereinafter described.

Figure 1:
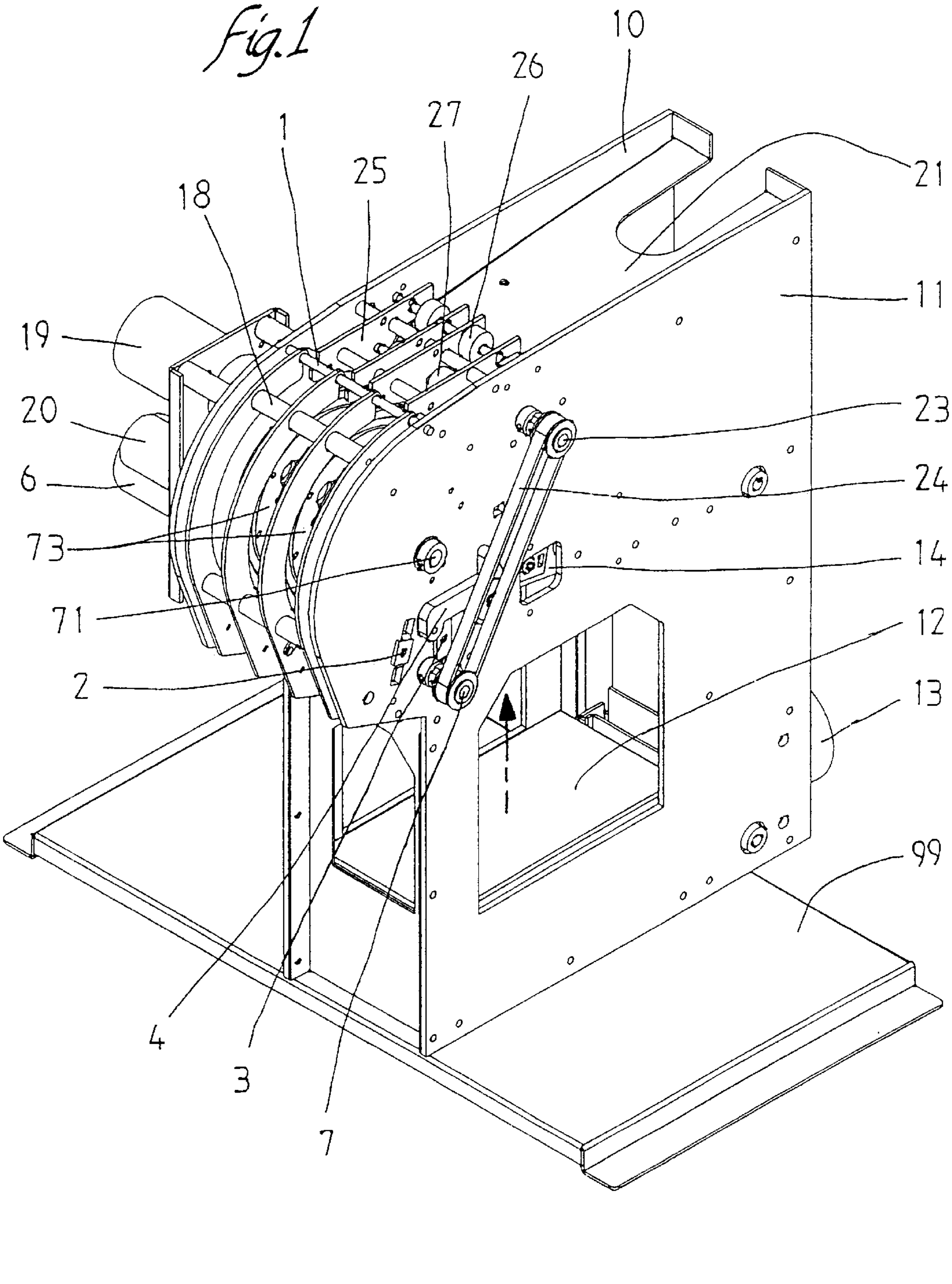
FIG. 1 is an isometric view of the apparatus according to the present invention.

To receive and feed an inventory of sheet objects such as bank notes or the like, the apparatus has an elevator apparatus 12 adapted to be moved vertically, with reference to FIG. 1, by a stepper motor 13 coupled to the elevator 12. A controller (not shown) such as a central processing unit, controls the operation of the stepper motor 13 and thereby the vertical movement of the elevator 12.

Figure 2:
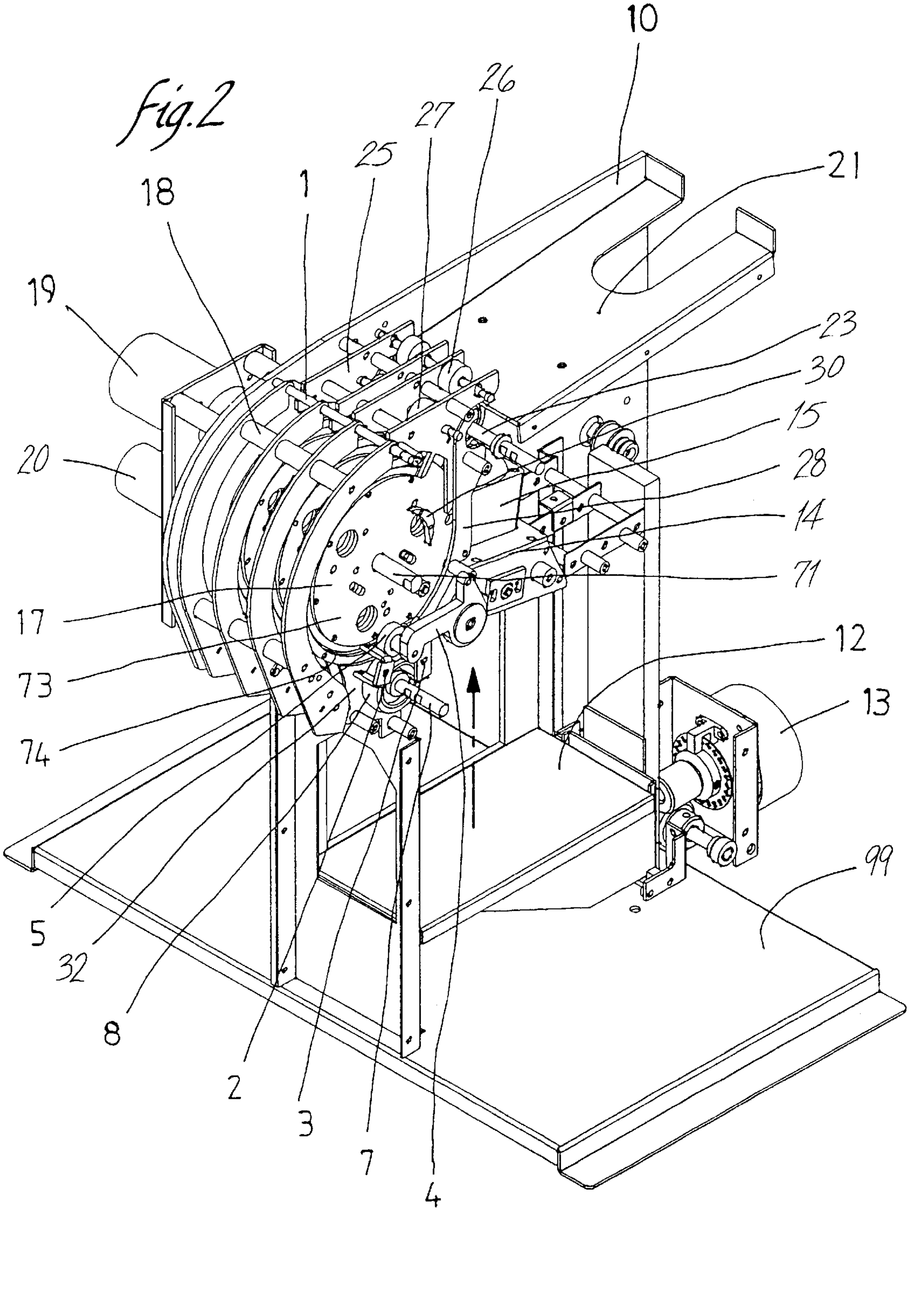
FIG. 2 is a cutaway isometric view of the apparatus of FIG. 1.
Figure 4:
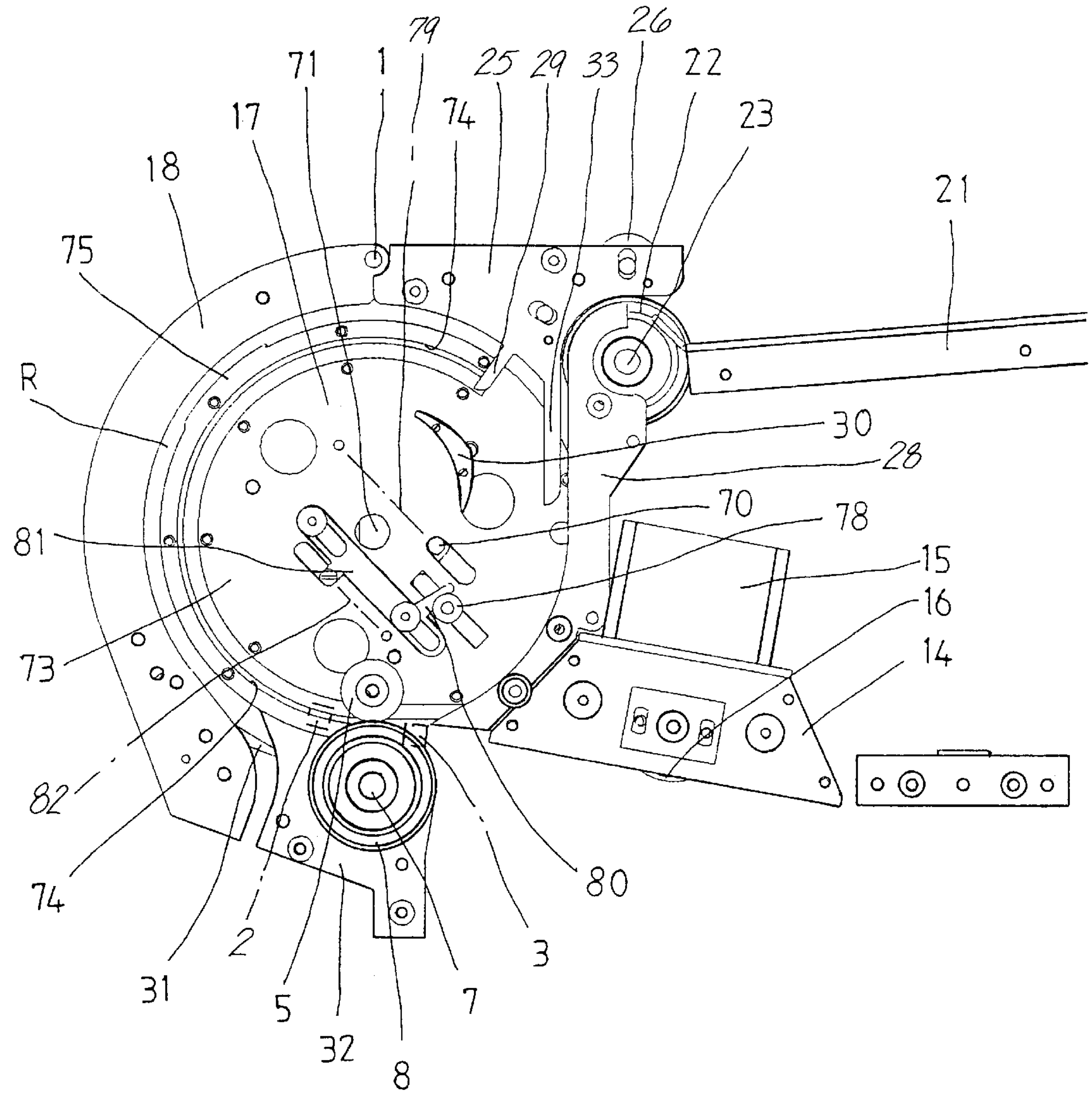
FIG. 4 is a section view of a portion of the apparatus of FIG. 1.
Figure 5:
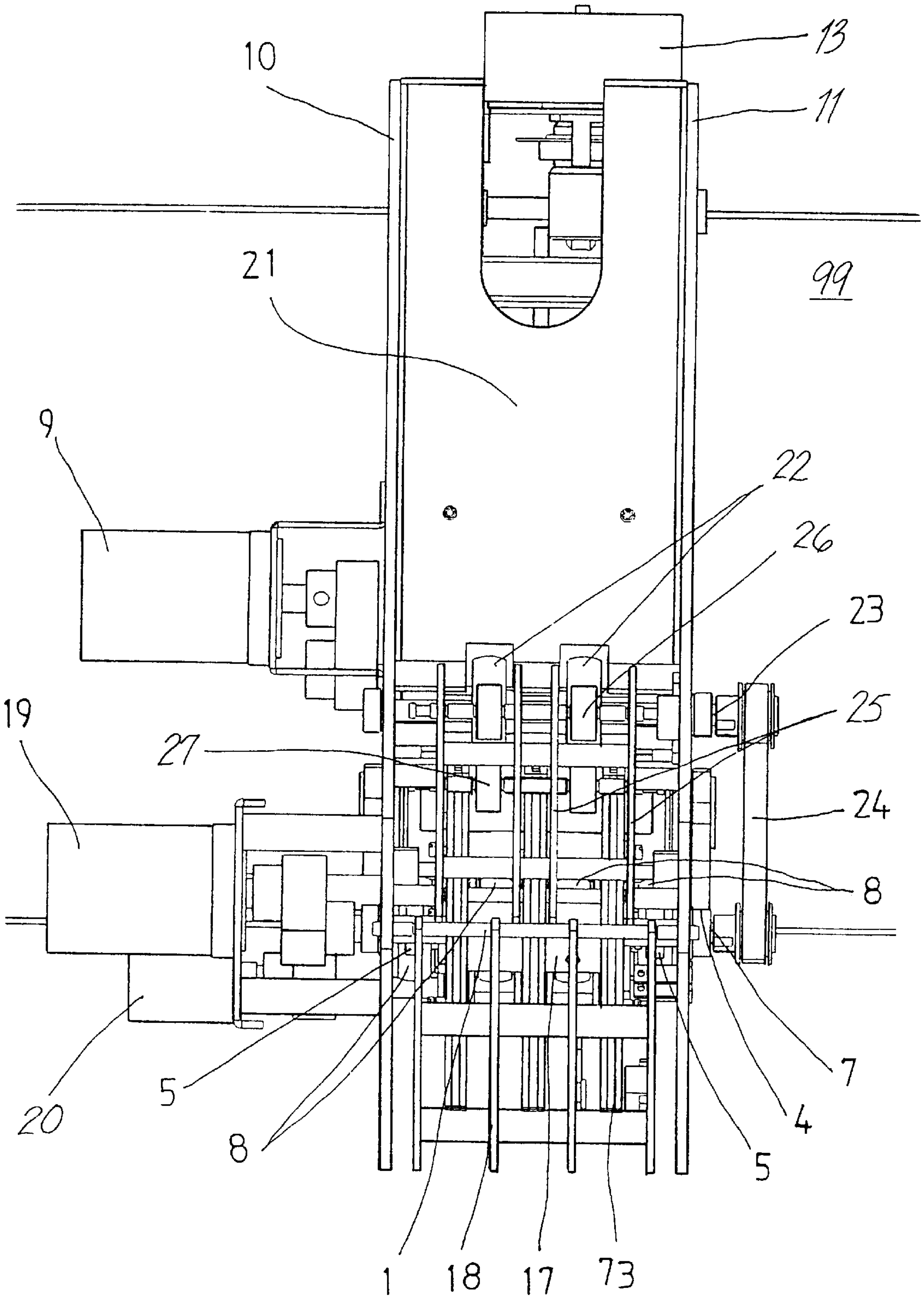
FIG. 5 is a partial top view of the apparatus of FIG. 1.

With reference to FIGS. 2 and 4, the apparatus includes a feeding apparatus 14 disposed over the elevator 12 and is adapted to remove the top, single sheet object from the inventory stacked on the elevator 12 and move it leftward with reference to FIG. 4. A fan 15 is disposed at the feeding apparatus 14 to create a slight vacuum and a feed wheel 16 moves the sheet object (not shown in FIG. 4) leftward for manipulation in the manner as hereinafter described. The feed wheel 16 is driven by a stepper motor 9 (FIG. 5) controlled by the processor controller through gearing (not shown).

Figure 6:
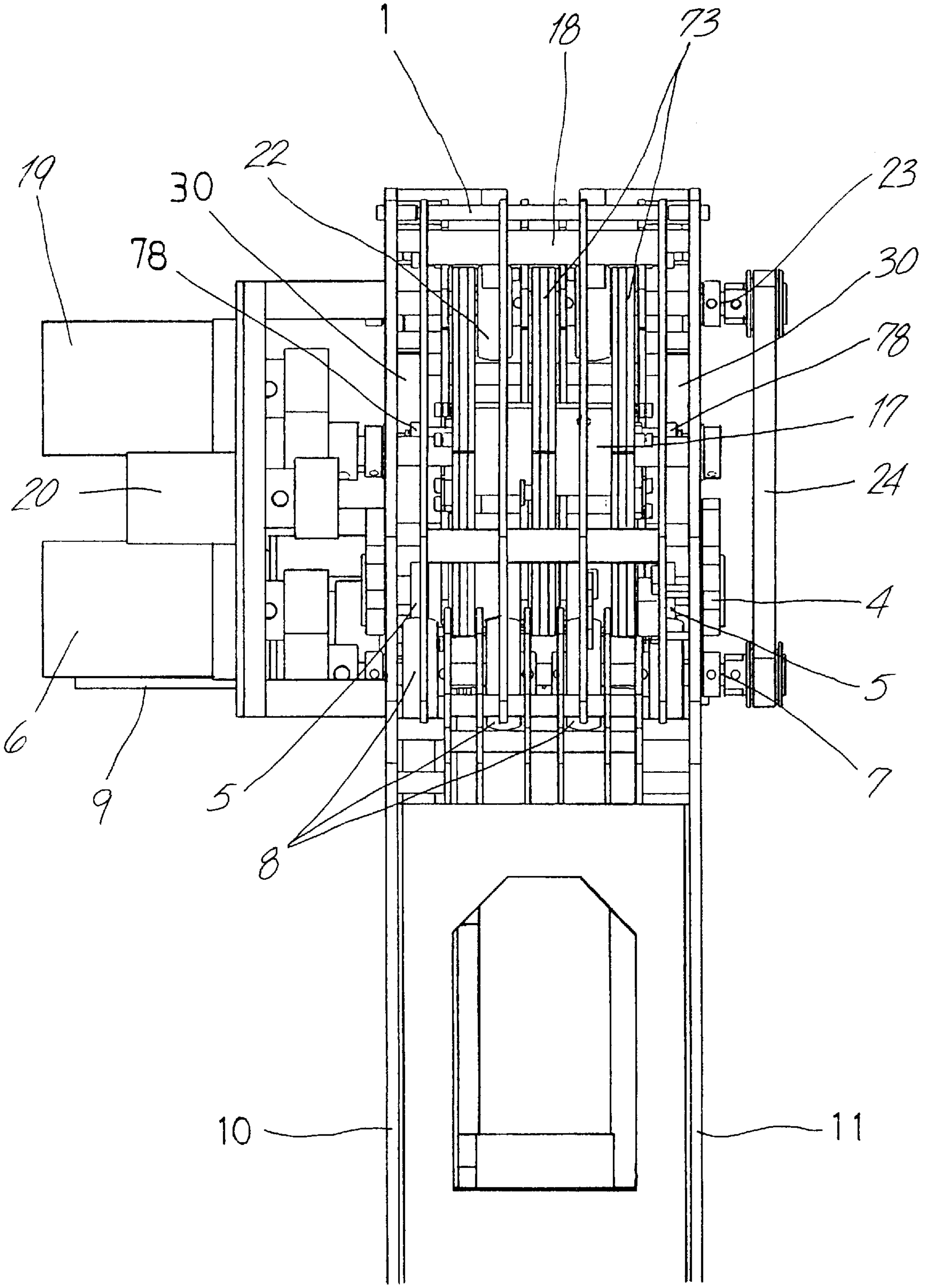
FIG. 6 is an end view of the apparatus of FIG. 1.

With continuing reference to FIG. 4, sheet objects removed from the stack thereof on the elevator 12 are urged leftwardly to be fed into a drum 17 by four small wheels 8 secured on a shaft 7. Guide boards 32 are disposed between the wheels 8 to support a sheet object for engagement by the wheels 8 and are secured to the sidewalls 10, 11 via a rod and spacer arrangement as suggested in FIG. 6. The shaft 7 is adapted to be rotated in a forward and reverse direction by a stepper motor 6 (FIG. 6) under control of the controller processor. With reference to FIG. 4, to cooperate with the wheels 8, rollers 5 are provided on weighted arms 4 to trap a sheet object between the wheels 8, and the rollers 5 for movement of the sheet object in a manner described above.

Disposed proximate the wheels 8 are first and second sensors, 2, 3, first sensor 2 adapted to sense and count the number of sheets urged between the wheels 8 and rollers 5, and more particularly, to assure that only a single sheet is moved. Sensor 3 is adapted to confirm that a sheet object fed between the wheels 8 and rollers 5 has been completely fed therethrough.

As shown in the drawings (FIGS. 2, 3), the apparatus includes a drum 17 defined by three disks 73 disposed on a shaft 71. By a stepper motor 19 and gearing 72, the shaft 71 and drum 17 are controlled by the processor to rotate in first and second directions, namely, in a clockwise and counter clockwise direction. The drum 17 is rotatably disposed within a housing 18 defining, with reference to FIG. 4, a cylindrical interior having an axial dimension adapted to receive and pass a sheet object and spaced from the outer periphery of the drum 17 to define a chamber R to store sheet objects as they are sequentially stacked therein in a manner described below. The housing 18 may have a portion thereof mounted on a hinge 1 so that the housing 18 may be opened to gain access to the drum 17 and for removal of sheet objects retained in the chamber R.

An encoder 20 (FIG. 5) senses the rotational position of the drum 17 within the housing 18 to determine the position thereof. Thus it is to be understood that, under control of the processor controller, the shaft 71 and attached drum 17 can be rotated to any desired position within the housing 18.

Figure 3:
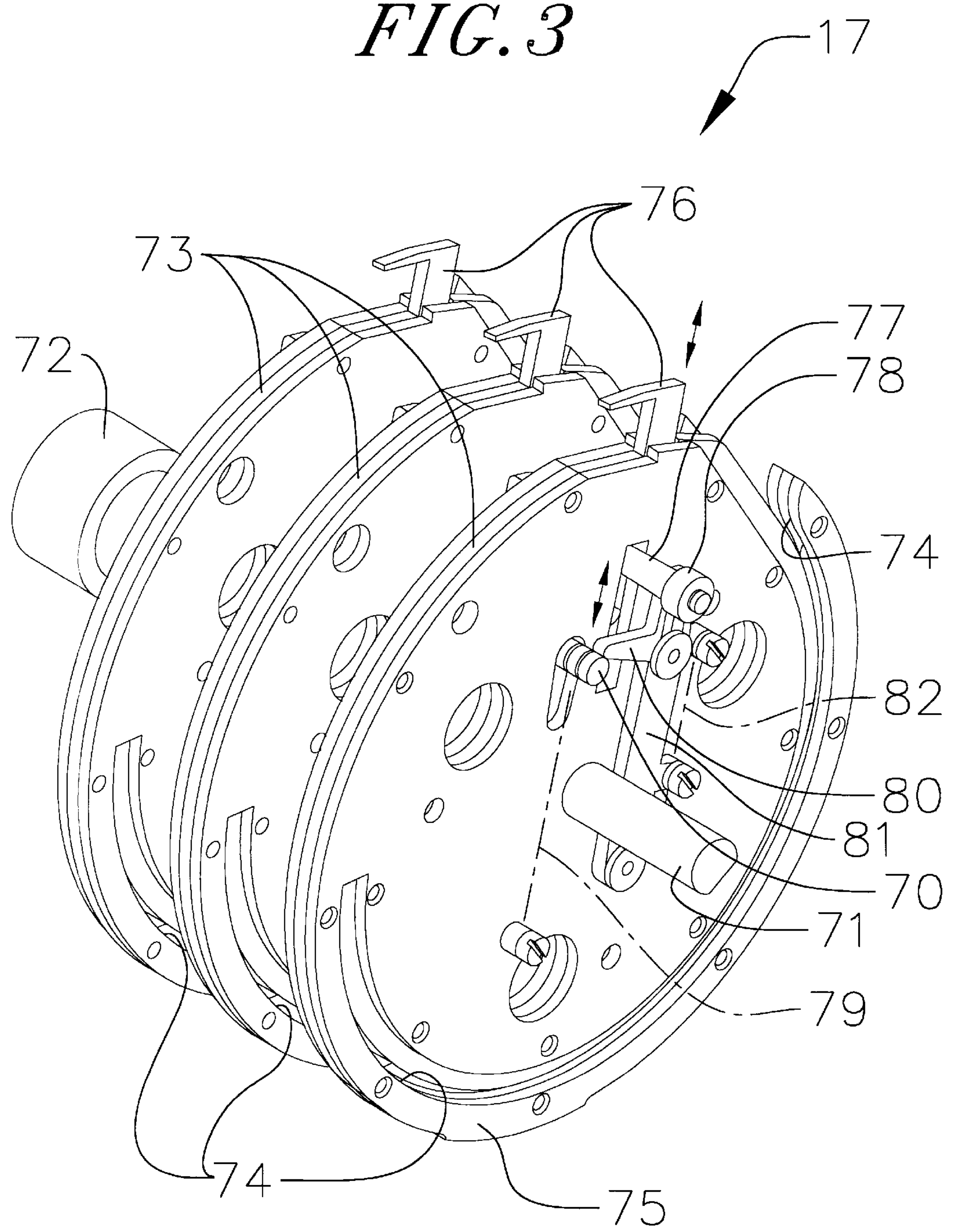
FIG. 3 is an isometric view of the drum of the apparatus of FIG. 1.

Each disk 73 of the drum 17 consists of three plates arranged in a stacked relationship as shown in FIG. 3. As shown in FIG. 3, each of the disks 73 is fixed on the shaft 71 at equal spaced positions. Also as shown in the drawings, and in particular FIGS. 3 and 4, each of the disks 73 includes spaced inwardly from its periphery, a circumferential compartment 74 having a circumferential length sufficient to receive the sheet object. As shown, the compartment 74, when viewing the disk 73 on end, is C-shaped. The compartment 74 opens to the periphery of each disk for the drum 17. Inasmuch the disks 73 are spaced, to define the drum 17, the contact resistance with a sheet object disposed within the compartment 74 is relatively small.

Each disk includes a claw 76 which is slideably retained between the sandwiched plates for retraction against the periphery of the disks 73 and extension thereof, as best shown in FIG. 3.

Figure 18:
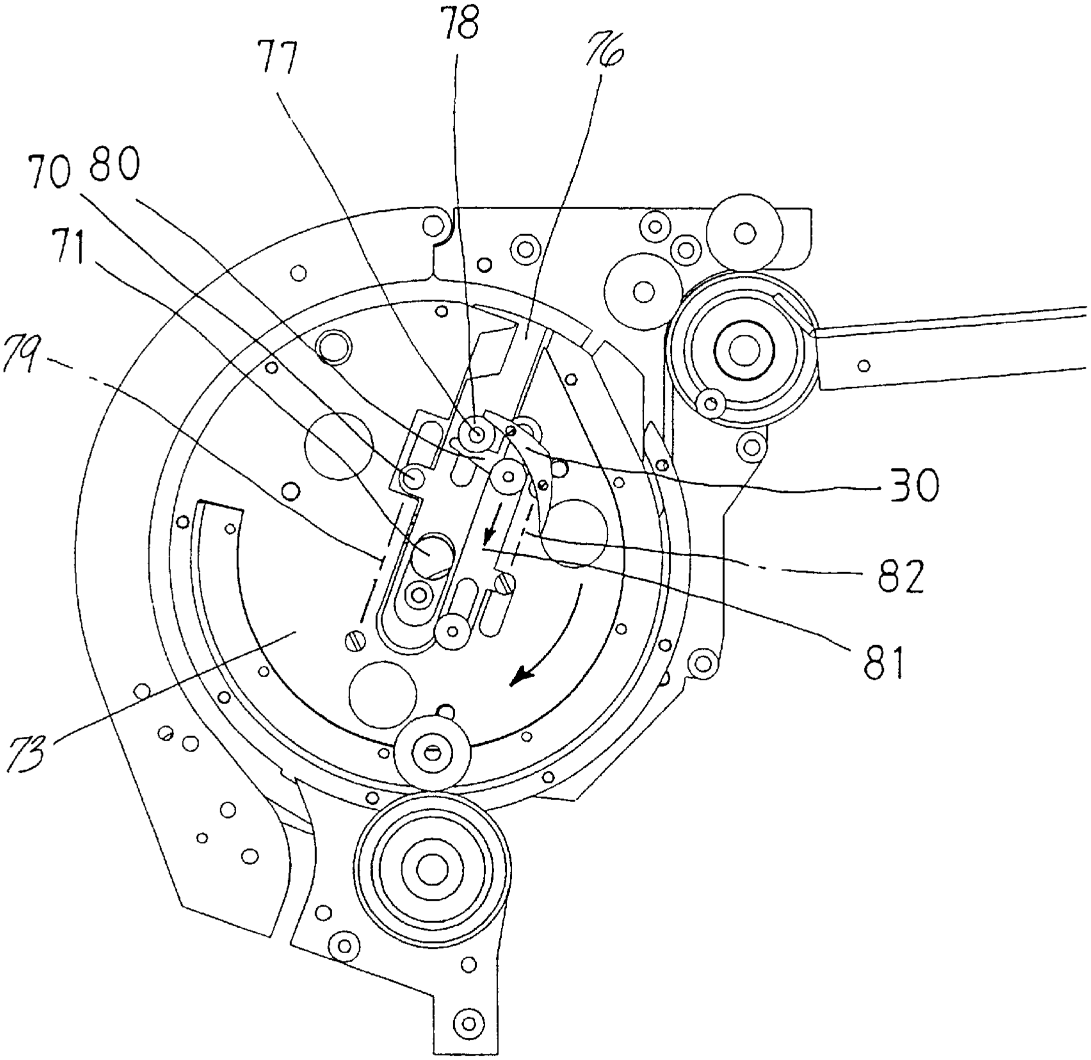
FIG. 18 is a section view of a portion of the apparatus showing various components thereof.

With continuing reference to FIG. 3, a first rod 77 is received through an aligned, elongated, rectangular opening through the disks 73 for radial movement within the opening relative to the shaft 71. A roller 78 is affixed to each end of the first rod 77 as shown in FIG. 3. Also as shown in FIG. 3, a second rod 70 is disposed through an elongated, aligned elliptical opening through the disks 73 of the drum 17 for movement parallel to that of the claws 76 as shown in FIG. 3. A spring 79 connected to the disk 73 biases the second rod 70 to its lower, or inward position as shown in FIG. 18. The second rod 70 is coupled to the claws 76 and accordingly movement of this second rod 70 extends and retracts the claws 76.

With continuing reference to FIGS. 3 and 4, an adjustment body 81 is slightably disposed on the axial outside surfaces of the disks 73 comprising the drum 17. A projecting one end 80 of the adjustment body 81 is adapted to engage and disengage from the first rod 77. A spring 82 has one end secured to the disk 73 and the other end to the adjustment body 81 to bias the adjustment body 81 to the position shown in FIG. 3.

With reference to FIG. 2, the apparatus includes a tray 21 which may be disposed above the elevator 12 between the sidewalls 10, 11. With reference to FIG. 4, friction wheels 22 disposed proximate the tray 21 are rotatable about a pivot axis 23 as driven by a belt 24 (FIG. 1) secured between the shaft 7 and pivot axis 23. Thus it is to be understood that the wheels 22 proximate the tray 21 can be rotated in a forward and reverse direction with the wheels 8. Guide partitions 25 in an F-shape are fixed between the sidewalls 10, 11 of the apparatus between the wheels 22. Rollers 26 and 27 (FIGS. 1 and 2) are disposed to be radially moveable relative to the pivot axis 23 to press and guide a sheet object against the wheels 22. Further, and with reference to FIG. 4, disposed below the wheels 22 is a guide foot 28 in the form of a J, the guide foot 28 secured between the sidewalls 10, 11 to guide the movement of a sheet object from the wheels 8 counter-clockwise, relative to FIG. 4, upwardly to the wheels 22 for discharge onto the tray 21.

Figure 7:
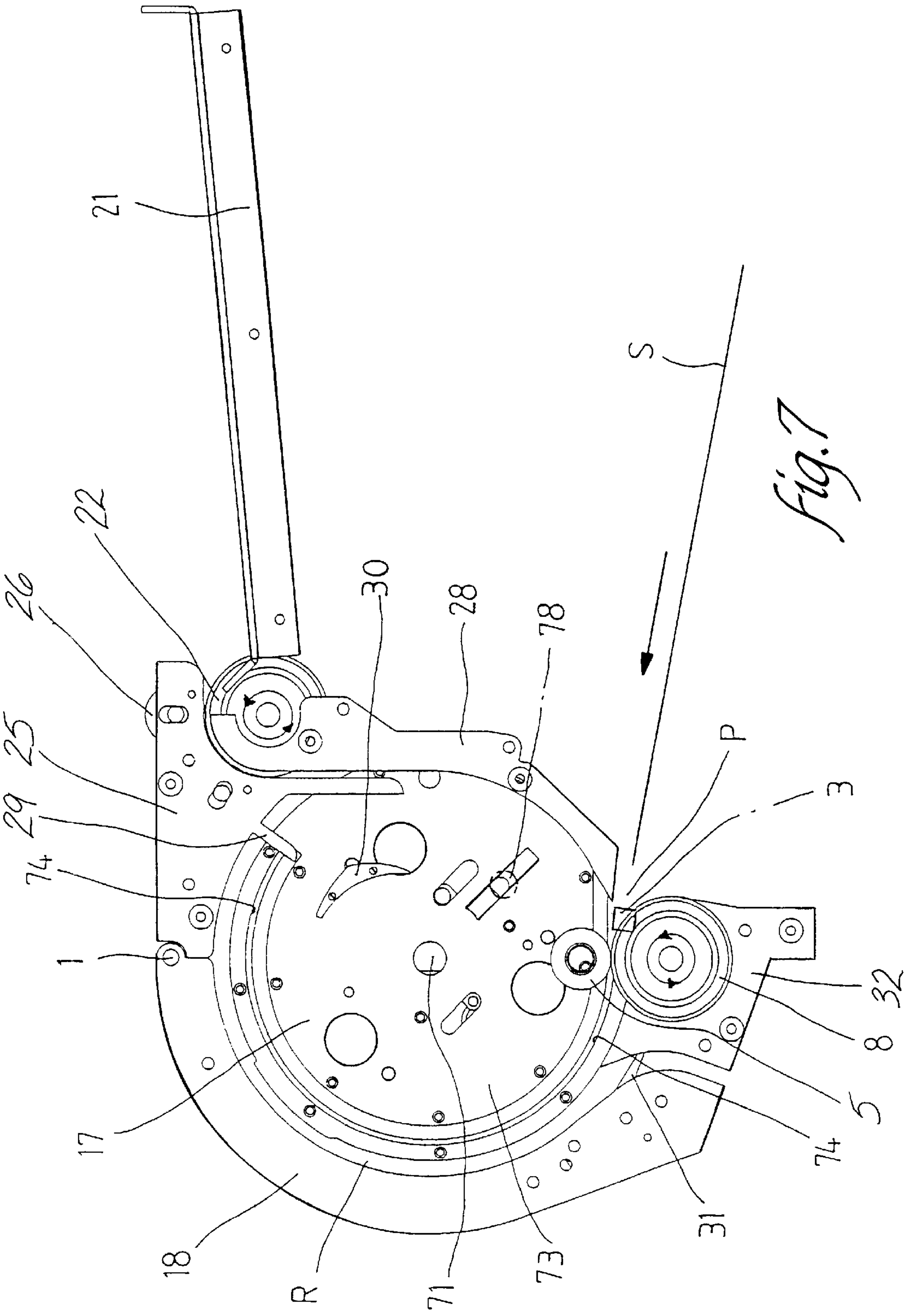
FIG. 7 is a section view of a portion of the apparatus of FIG. 1 showing the operation thereof.
Figure 8:
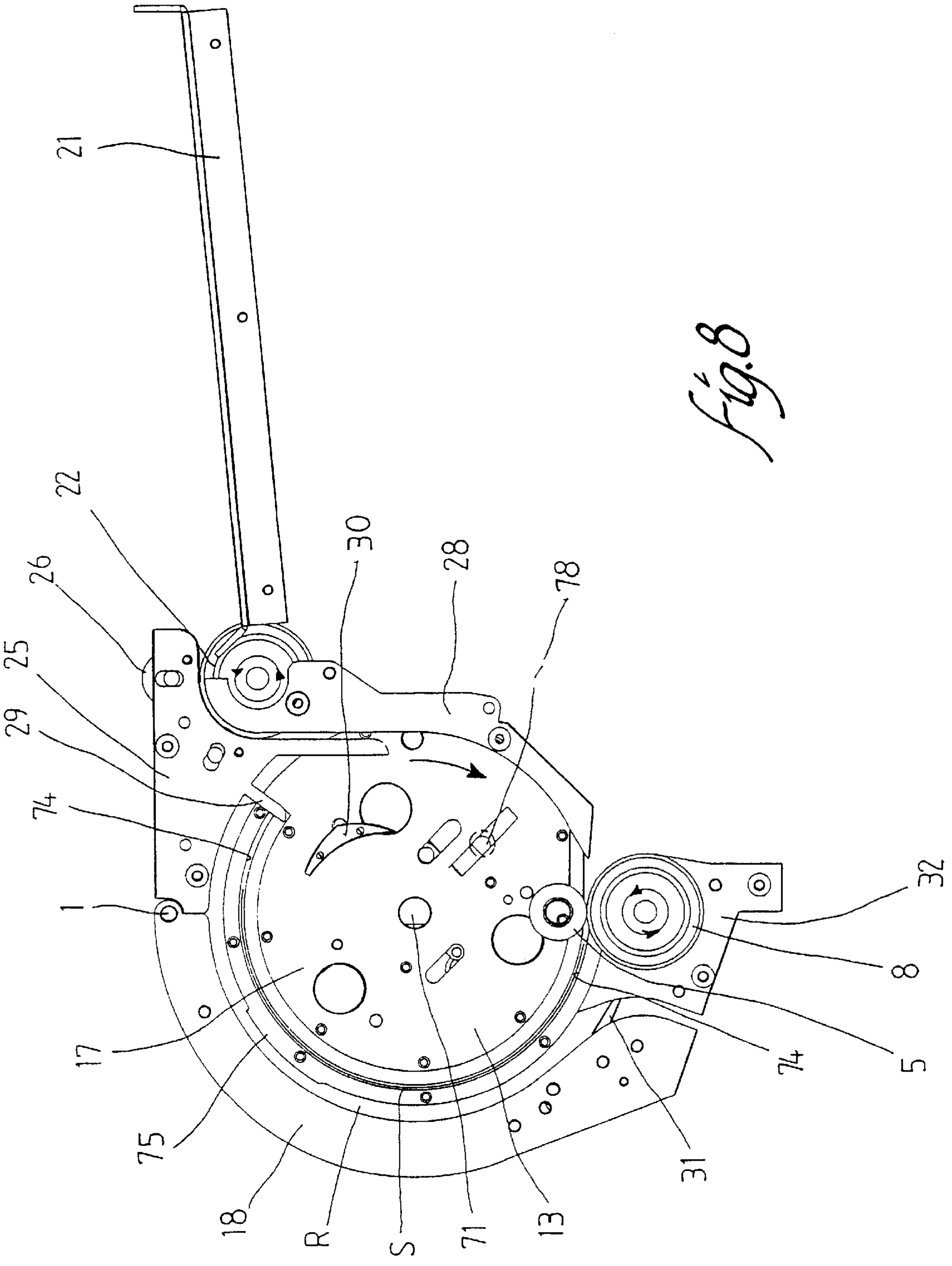
FIG. 8 is a section view similar to that of FIG. 7 showing the sheet object fed into the compartment of the apparatus.
Figure 9:
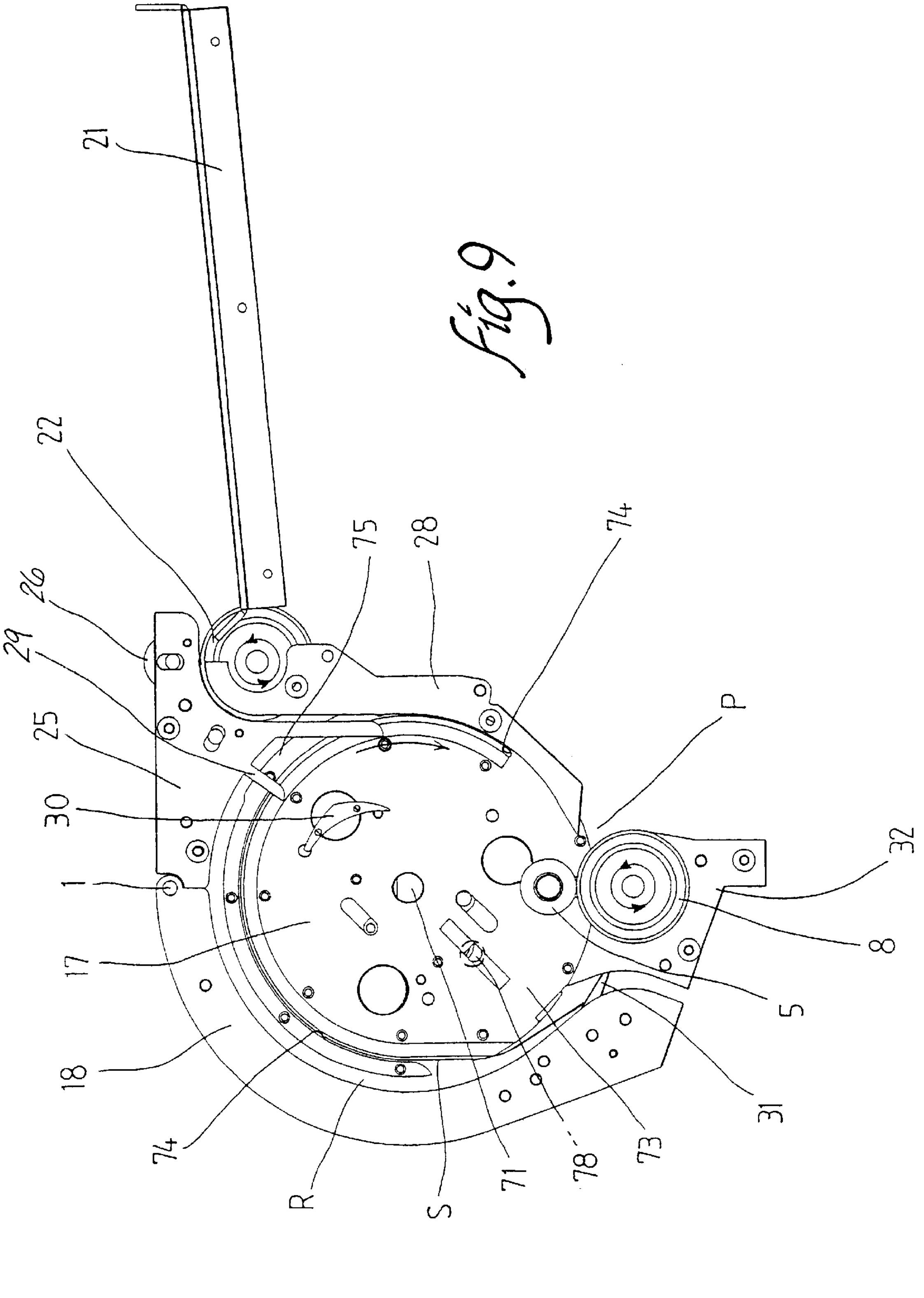
FIG. 9 is a section view similar to that of FIG. 7 showing the withdrawal of the sheet object from the compartment and into the chamber.
Figure 10:
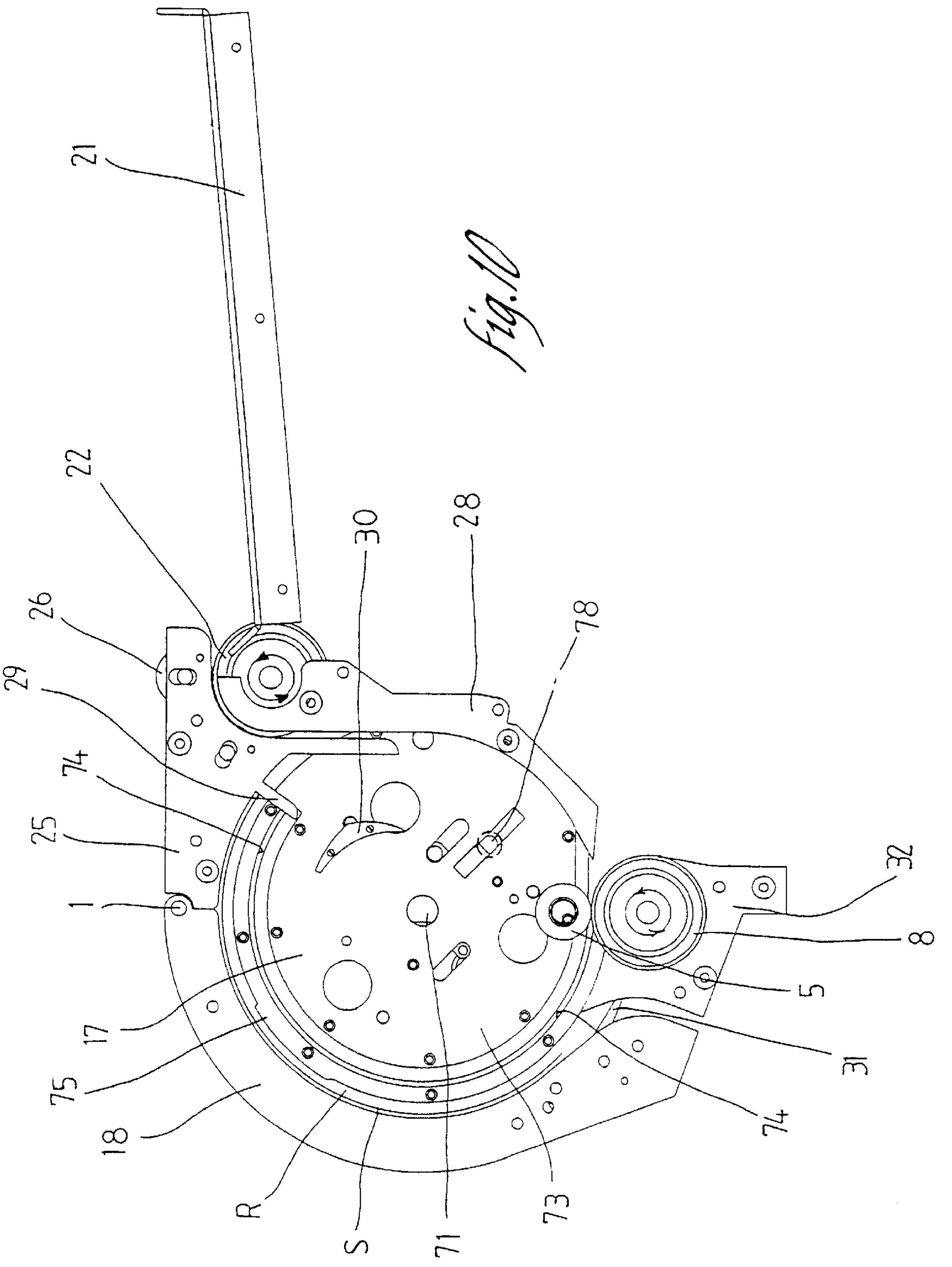
FIG. 10 is a section view similar to that of FIG. 7 showing the positioning of the sheet object in the chamber.

With reference to the foregoing, the general operation of the apparatus according to the present invention will now be described. The elevator 12 is moved upwardly by controlling the stepper motor 13 to position a sheet object S disposed thereon at the feeding apparatus 14. At the feeding apparatus, and with reference to FIG. 7, a sheet S is lifted and moved by the feed wheel 16 into the nip defined between the rollers 5 and wheels 8 of the apparatus along a path P. The wheels 8 are rotated counter-clockwise as illustrated in FIG. 7 and the sheet object S is counted by the first sensor and directed into the compartment 74 of the drum 17 which has been parked by the stepper motor 9 and encoder 20 in a feed position as shown in FIG. 7 to accept the sheet object S into the compartment 74. When the sheet object S has completely been sent into the compartment 74 the second sensor 3 sends a signal to the controller indicating insertion of the sheet object. In response to the signal generated by the second sensor 3, the drum 17 is rotated clockwise as shown in FIG. 8 from the feed position. The sheet object S in the compartment 74 is retained by contact resistance therein. A stop 29 disposed on the guides 25 during rotation of the drums 17 contacts the sheet object S and as the drum 17 is continued to be rotated clockwise the sheet object S is restrained by the stop 29 and is extracted from the compartment 74 into the stack chamber R. In the event that the sheet object S has a bend or fold, a protrusion 75 (FIG. 10) urges the sheet objects in the stack chamber R against the housing. Moreover, the rotation of the drum 17 and its protrusion 75 urges the sheet objects in the stack chamber R to remain therein abutting the stop 29. The drum 17 continues to rotate clockwise back to the feed position to receive another sheet S from the feeding apparatus 14. The rotation of the drum 17 through this 360° rotation to position a sheet object S in the stack chamber R is shown by FIGS. 7 through 10.

Figure 19:
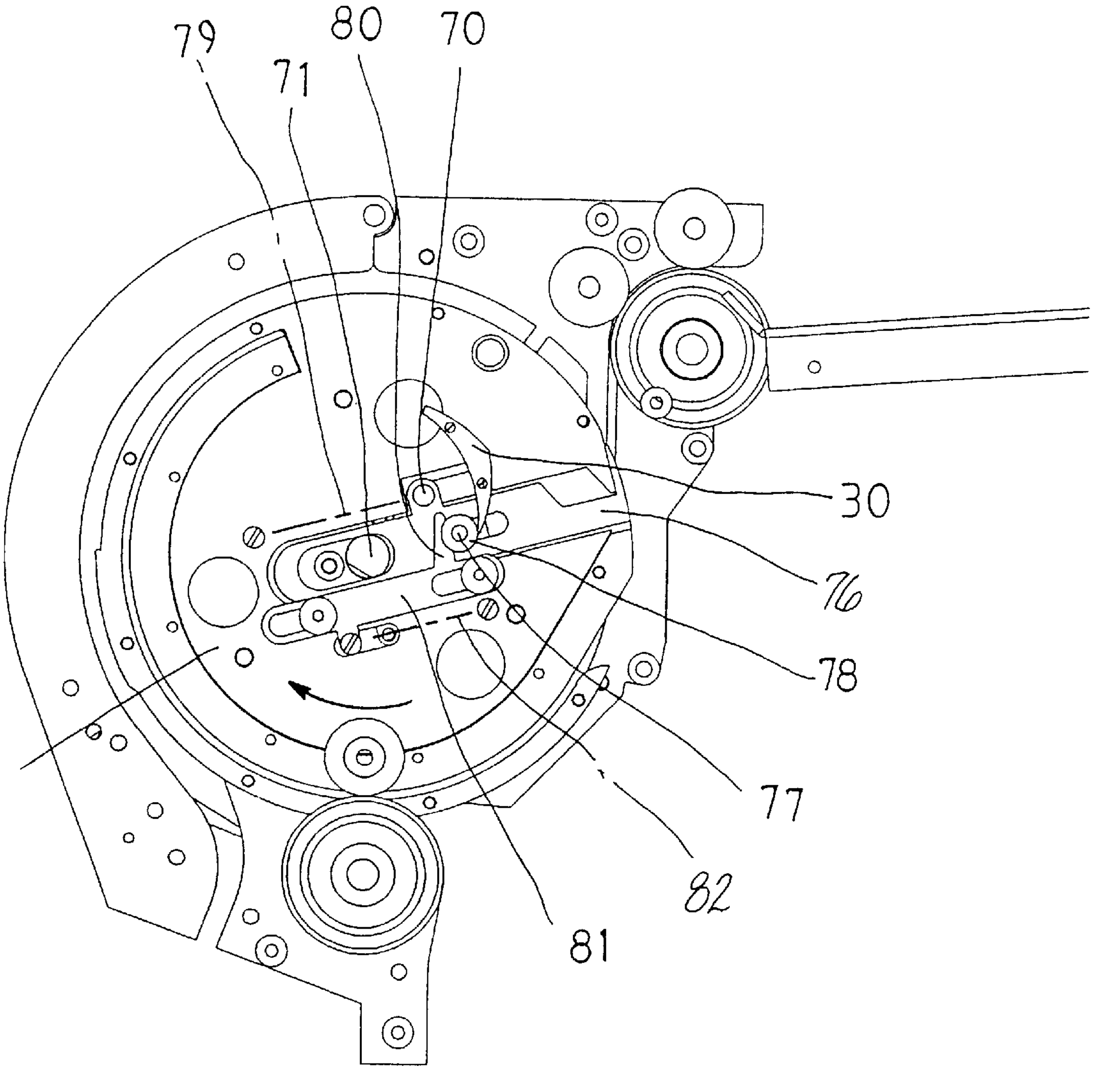
FIG. 19 is a section view similar to that of FIG. 18 showing the operation of various components thereof.

The rotation of the drum 17 causes the rollers 78 fixed on the rod 77 to engage the inner surface of cams 30 disposed on each of the sidewalls 10, 11 as shown in FIGS. 18 and 19. FIG. 18 shows the state at which the rollers 78 begin contact with the radially inward surface of the cam 30 urging the roller 78 and rod 77 radially inward against the one end 80 of the adjustment body 81 and against the bias of the spring 82.

The opening receiving the rod 77 in the claw 76, as shown in FIG. 18, is elongated and accordingly the movement of the adjustment body 81 does not move the claw 76 from its retracted position. When the rollers 78 pass the fixed cam 30, the spring 82 urges the rod 77 and rollers 78 to return to their original position by engagement with the one end 80 of the adjustment body 81.

With reference to FIG. 4, at the lower portion of the stack chamber R there is a closure 31 disposed to open and close an opening from the stack chamber R to outside of the housing 18. A spring (not shown) may be provided to urge the closure 31 to a closed position as shown in FIG. 4.

Figure 11:
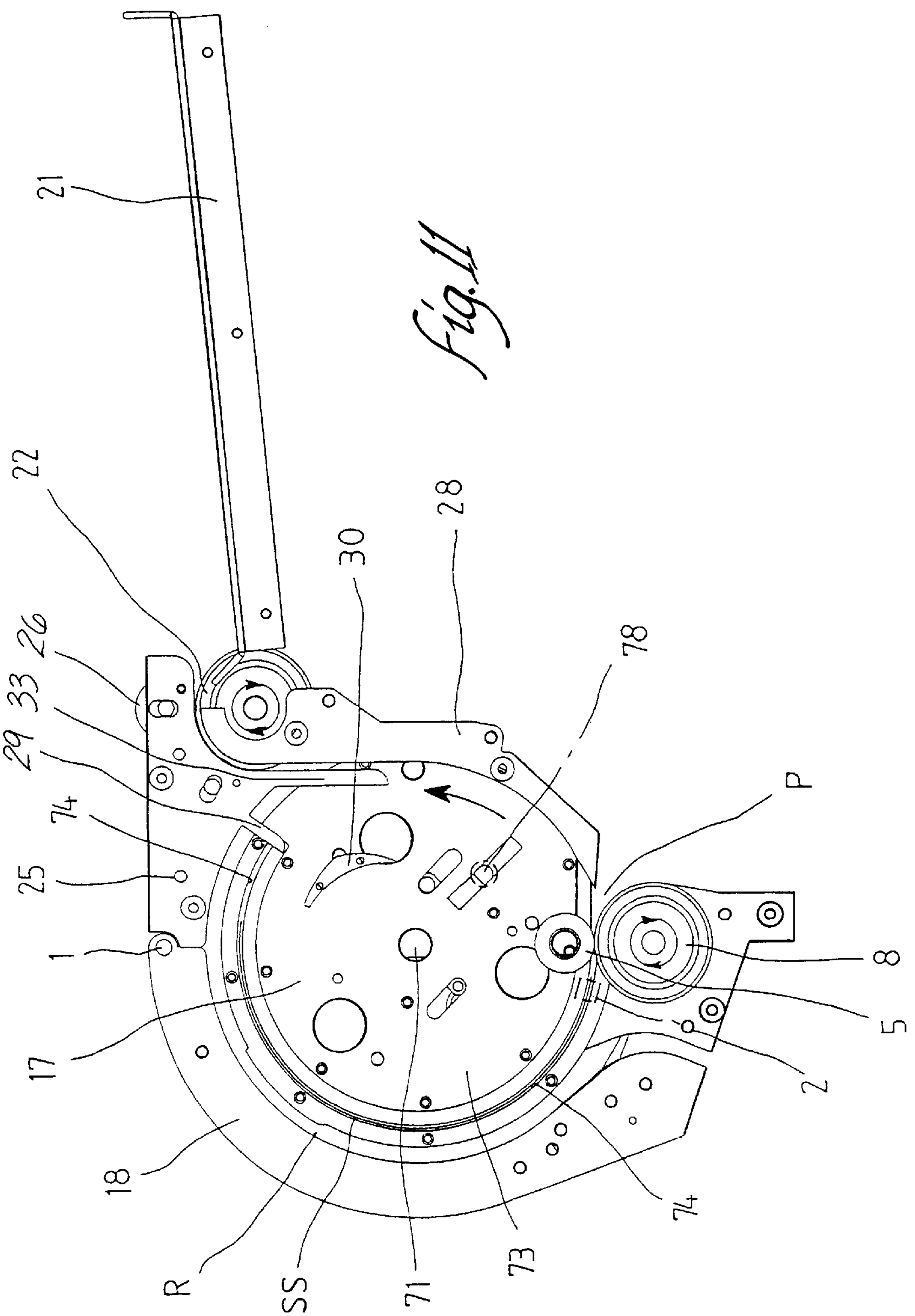
FIG. 11 is a section view similar to that of FIG. 7 showing the feed of a plurality of sheets into the drum compartment.
Figure 12:
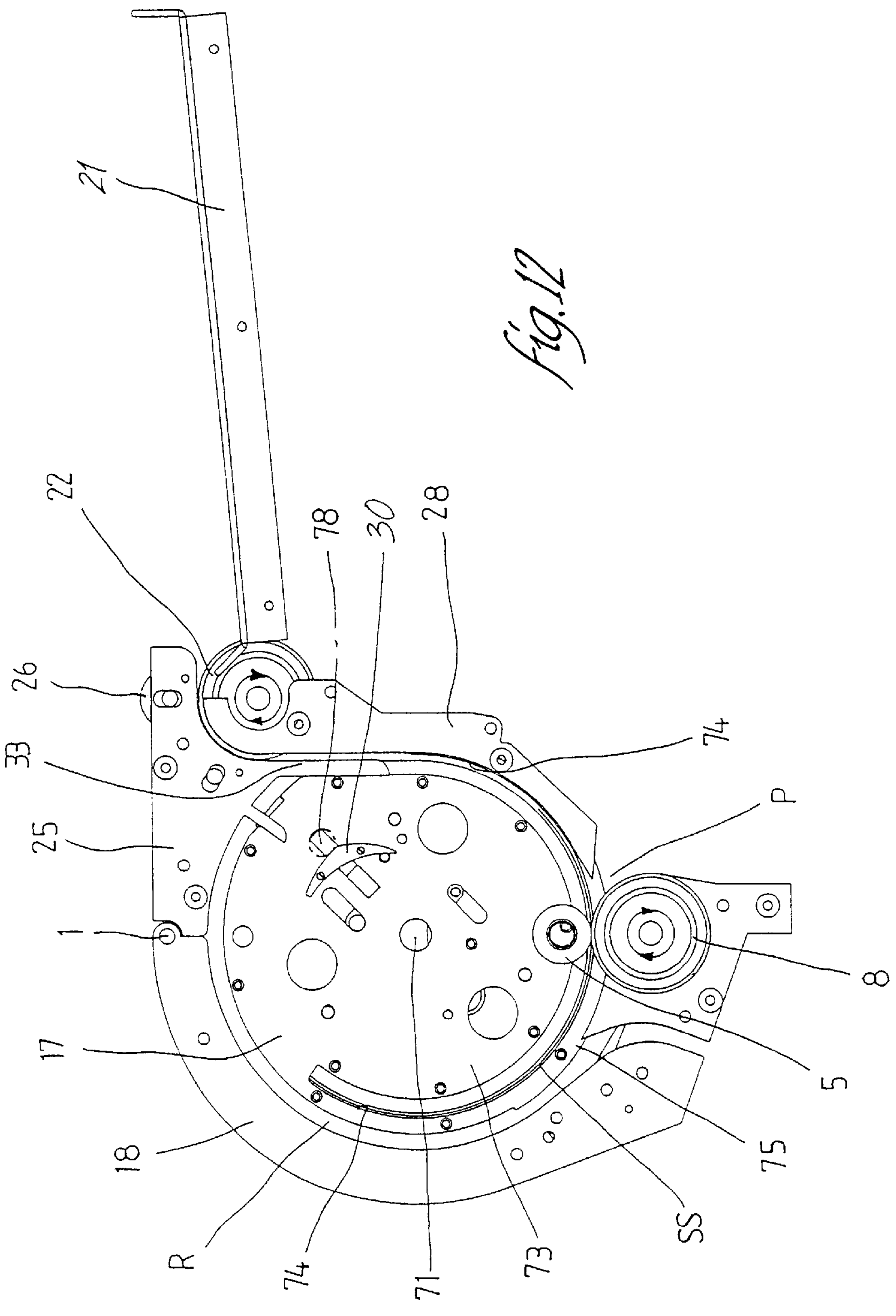
FIG. 12 is a view similar to that of FIG. 11 showing the removal of the multiple sheet objects fed into the compartment.
Figure 13:
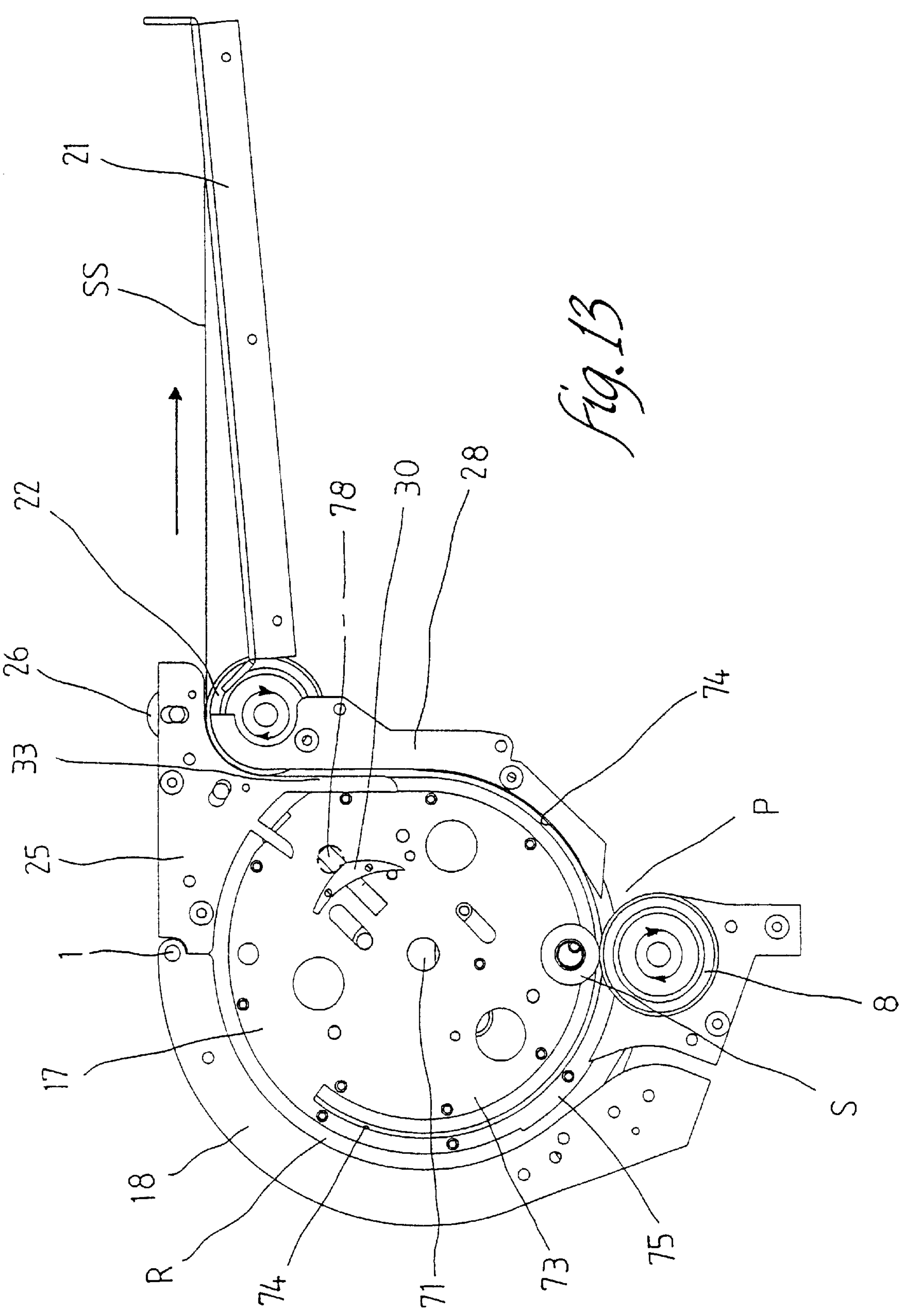
FIG. 13 is a further view of the progress of the sheet objects as removed from the compartment of FIG. 12.

In the event that a pair of sheet objects SS are simultaneously pulled and directed into the compartment 74 by the wheels 8 and rollers 5, the pair of sheet objects SS are detected by the first sensor 2 as shown in FIG. 11. In the event of sensing a pair of sheet objects SS being simultaneously directed into the compartment 74, the first sensor 2 will send a signal to the controller to urge the wheels 8 to be rotated in a clockwise direction. Simultaneously, the drum 17 is urged to also rotate in a counter-clockwise direction from the feed position to block the path P from the feed apparatus 14 to a pre-determined position as shown in FIG. 12. In this position the path P of sheet objects to the compartment 74 is closed. The sheet objects SS are trapped between the nip between the wheels 8 and rollers 5 and are extracted from the compartment 74 and directed along the guide foot 28 guide piece 33 to be trapped between the wheels 22 and rollers 26 which are rotated clockwise to draw the sheet objects SS from the housing 18 as shown in FIG. 13 onto the tray 21. In this fashion only one sheet object S, as counted by the first sensor 2, is stacked at a time in the stacking chamber R. Misfed sheet objects SS are directed to tray 21.

When a sufficient number, as pre-determined by suitable means such as the controller, of sheet objects S have been counted and stacked in the stacking chamber R the cover 18 may be opened at its hinge 1 to remove the bundle of stacked sheet objects from the stacking chamber R.

As can be appreciated, the cover 18 may be free to pivot about the hinge 1 and supported by a spring whereby the bundle of sheet objects disposed in the stacking chamber R can be made in ever increasing stacks. Further, the stacking chamber R may be positioned at the bottom of the housing 18 to accommodate the stacking of the sheet objects. Moreover, the apparatus as described can be operated in a horizontal fashion, i.e. with the shaft 71 directed vertically. Furthermore it is to be understood that while only three disks 73 are shown, the drum 17 could be made up of two or more disks 73. Also it is to be understood that by altering the dimensions of the drum 17 and housing 18, larger or smaller sheet objects can be accommodated. Further, it is to be understood that the compartment 74 while fashioned in a peripheral, C-shape, it could also be helical or U-shaped.

Figure 14:
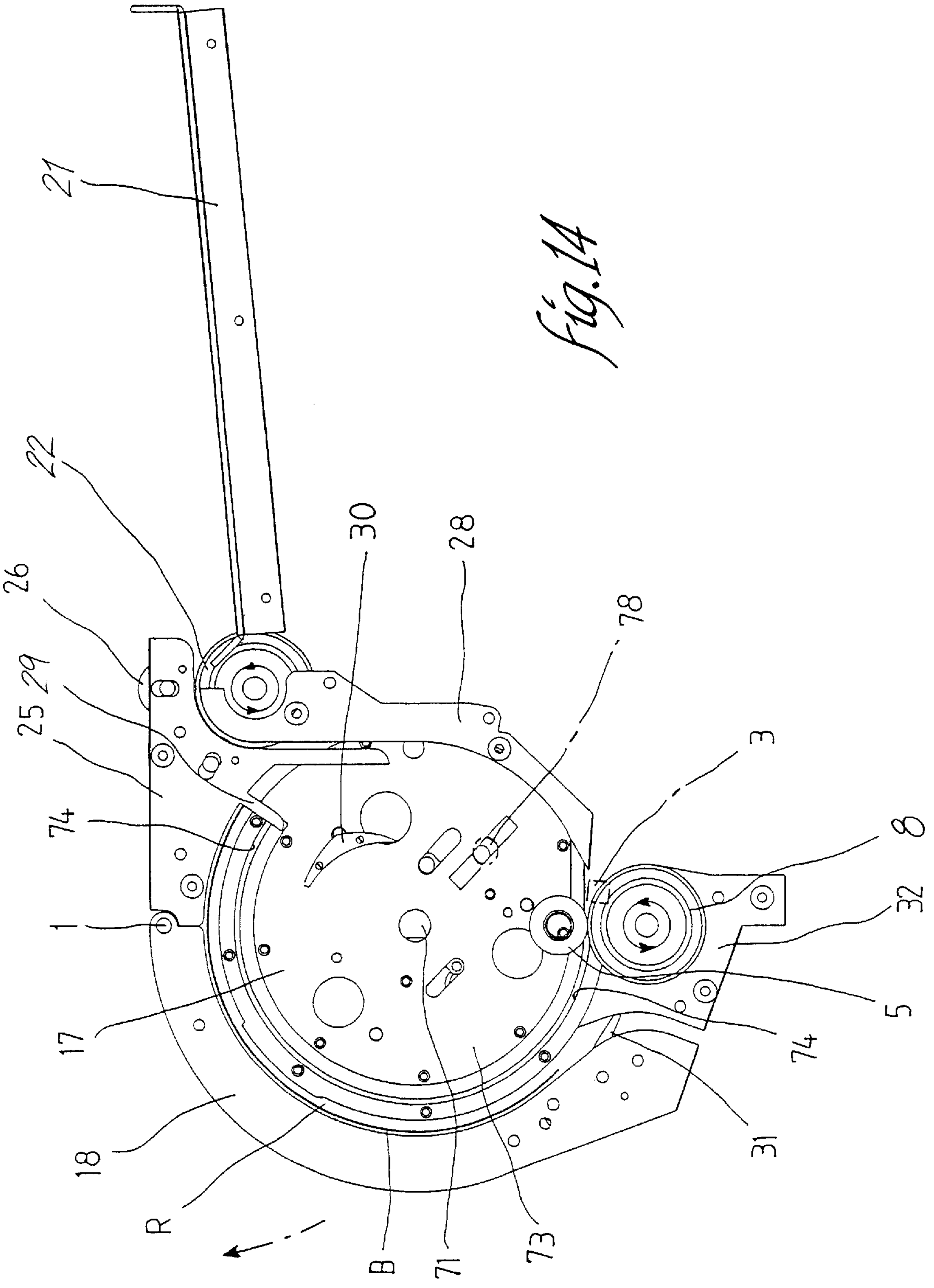
FIG. 14 is a section view of the apparatus showing the placement of a sheet bundle.
Figure 15:
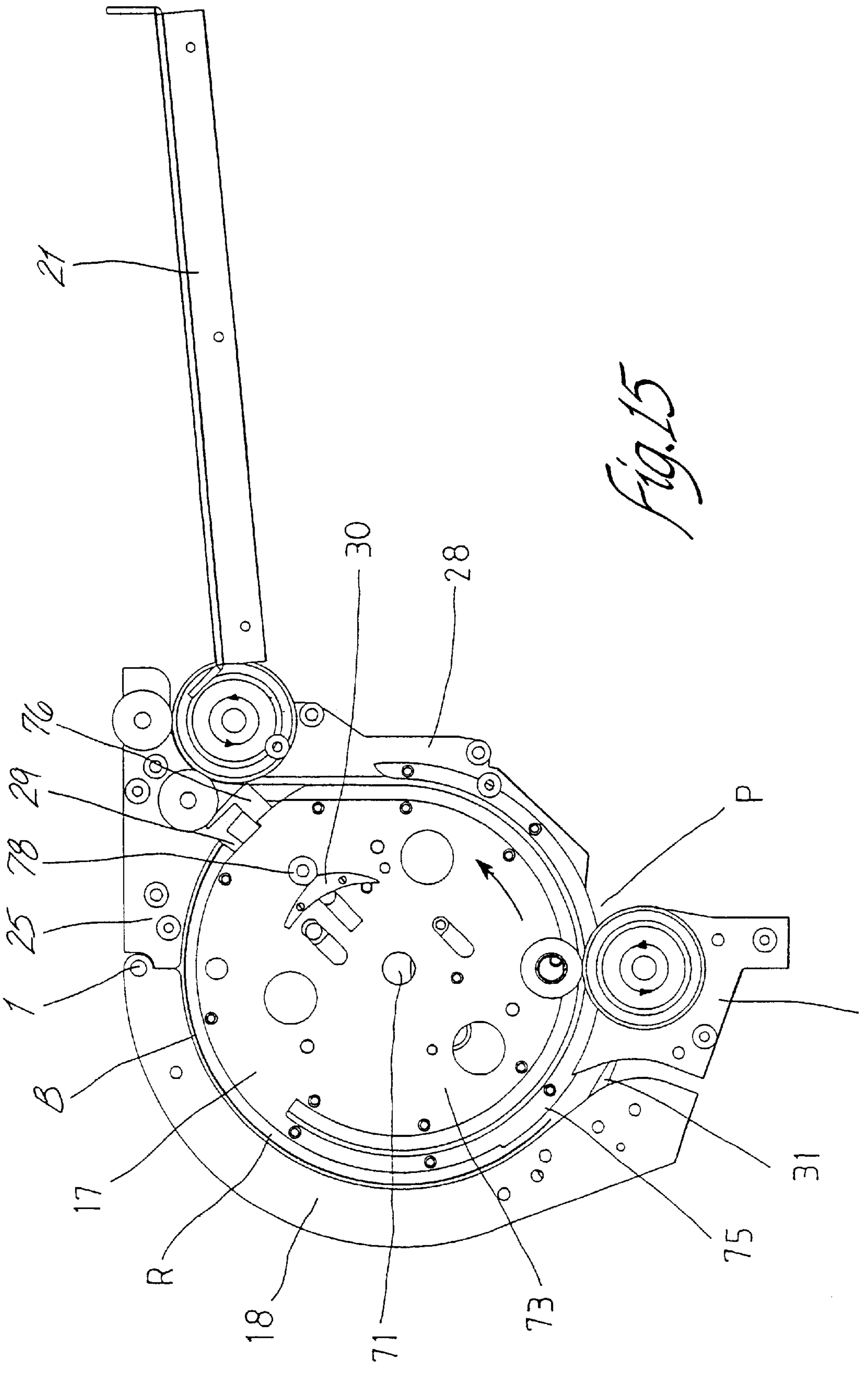
FIG. 15 is a section view of the apparatus similar to that of FIG. 14 illustrating further aspects of the present invention.
Figure 16:
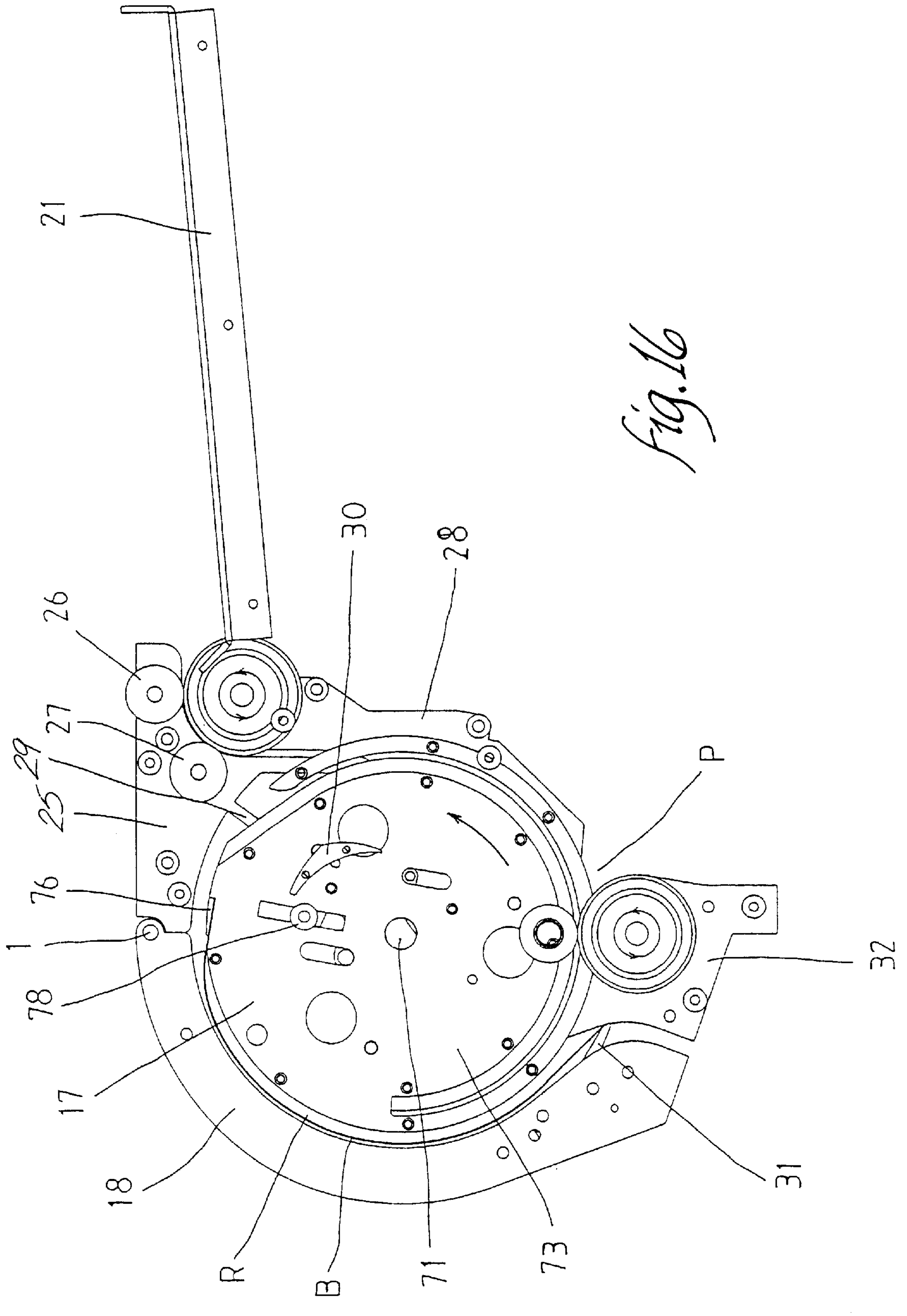
FIG. 16 is a section view similar to that of FIG. 14 illustrating further aspects of the present invention.
Figure 17:
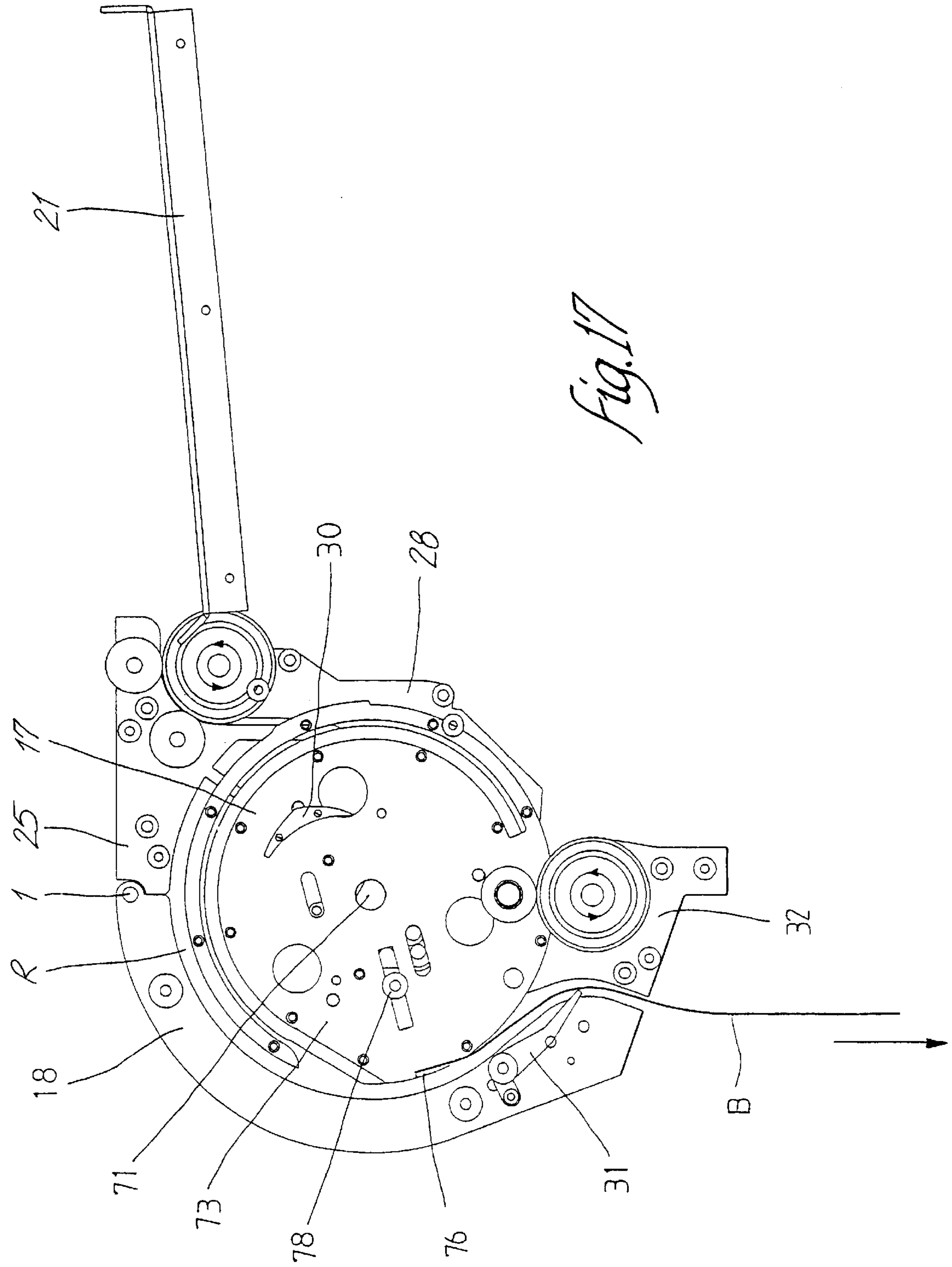
FIG. 17 is a view similar to that of FIG. 14 showing placement of the sheet bundle for removal.
Figure 20:
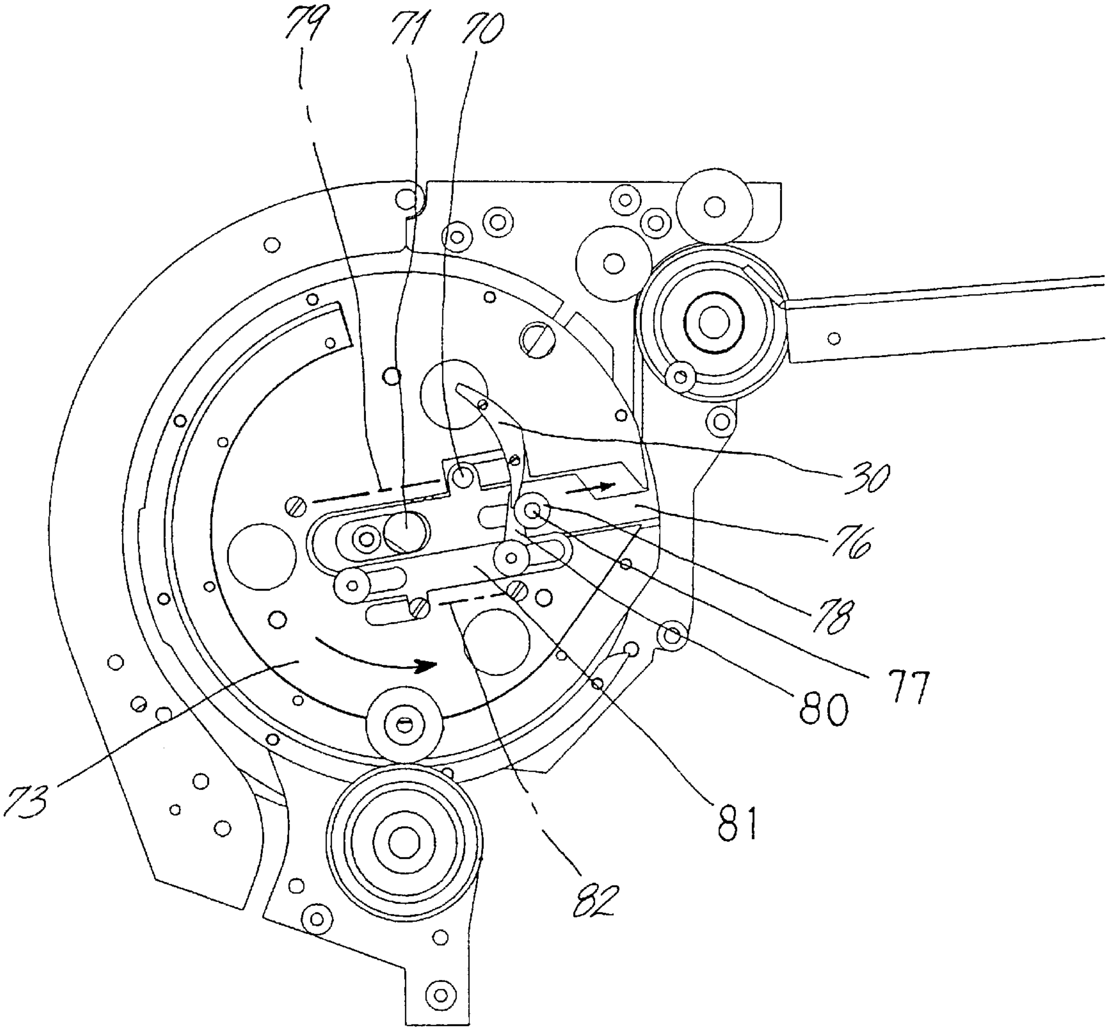
FIG. 20 is a section view of the apparatus similar to that of FIG. 18 showing the various components of the invention.
Figure 21:
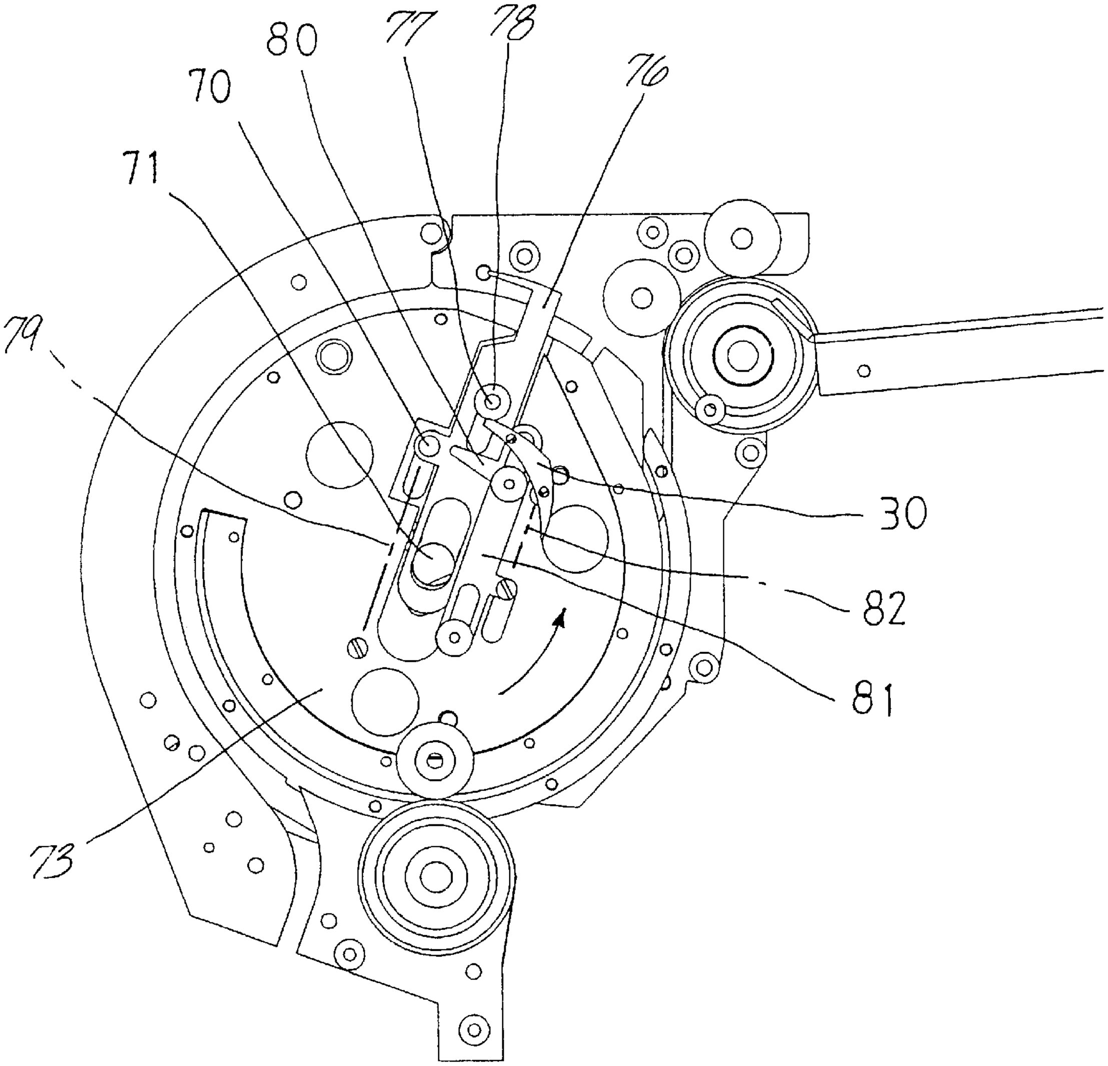
FIG. 21 is a section view similar to that of FIG. 14 showing various components of the present invention.

In an alternative embodiment, when a sufficient number of sheet objects S have been accumulated as a bundle in the stacking chamber R as counted by the first sensor 2, shown as sheet bundle B in FIG. 14, the processor controller controls the stepper motor 19 and drum 17 to rotate counter-clockwise as shown in FIG. 15. The counter-clockwise rotation of the drum 17 causes the small rollers 78 to engage the exteriors of the fixed cams 30 which displaces the roller 78 and its rod 77 to urge the claw 76 to extend from the disks 73 as shown in FIGS. 20 and 21. As shown in FIG. 21, the claw 76 is in a position to engage the sheet bundle B stored in the stacking chamber R, and more specifically to contact the edge of the bundle heretofore stacked against the stop 29. As the roller 78 rolls over the exteriors of the cams 30, the shaft 77 is moved radially outward urging the claws 76 to extend from their retracted position on the disk 73 to engage the edge of the sheet bundle B heretofore stacked against the stop 29 of the stacking chamber R. This position is shown in FIG. 21. When the rollers 78 have cleared the cams 30, under the bias of the spring 79, the shaft is biased to retract claws 76 into the disks 73 to grasp the ends of the sheet bundle B as shown in FIG. 16. Continued rotation of the drum 17 urges the sheet bundle B, as shown in FIG. 17 pass the closure 31 to be extended from the housing 18. During this motion it is to be understood that the feed path P has been closed by the disks 73. The drum 17 is controlled by the controller to stop with the sheet bundle B retained by the claws 76 and projecting from the housing 18. If the bundle B is pulled from below, it is pulled from the retention by the claws 76 and freed from the apparatus. If the bundle B has remained in the position as shown in FIG. 17 for a predetermined period of time, the processor controller will control the stepper motor 19 to rotate the drum 17 to return the bundle B to the stack chamber R.

It is to be understood that while the claw 17 is formed in the shape of an L, it can be in the form of a pin, rod or finger. In this instance, since the bundle B is not grasped by the claws 76 to be retained while suspended from the housing 18, a tray (not shown) would have to be placed to receive the discharged bundle. Where the claws 76 are formed as a pin or rod they may be fixed to the shaft 77 with one end of the spring 79 connected to the shaft 77 and the other end fixed to the disk 73. In this case the adjustment body 81 can be omitted. In this case, the pin is extended by the roller 78 rolling over the cam.

While I have shown and described certain embodiments to the present invention, it is to be understood that it is subject to many modifications and changes without departing from the spirit and scope of the appended claims.

I claim:

1. A count and discharge apparatus for a sheet object comprising:

a housing;

a drum disposed in the housing, said drum having (i) an outer periphery spaced from the housing to define a chamber to receive at least sheet object for discharge and (ii) a circumferential compartment opening to the periphery and adapted to fully receive a sheet object when said drum is at a feed position, said housing including an access to said chamber;

means for feeding a sheet object to the compartment;

means for counting the sheet object fed into the compartment;

means for rotating the drum in a first direction from said feed position;

a stop disposed in the housing to engage the sheet object in the compartment when the drum is rotated in the first direction to urge the sheet object from the compartment into the chamber for removal by the access from the housing a collection tray;

means for rotating the drum in a second direction from said feed position to a second position; and means for extracting and transporting said sheets from said compartment to said collection tray.

2. The apparatus of claim 1 including a controller adapted to control said feeding means, counting means and rotating means to serially locate a stack of a selected number of sheet objects in said chamber.

3. The apparatus of claim 1 including means for sensing the feeding of an incorrect number of sheet objects into said compartment, said extracting means extracting said incorrect number of sheet objects from the compartment.

4. The apparatus of claim 3 wherein said feeding means includes a wheel rotatable in a first direction to direct a sheet object into said compartment, said extracting means including means for rotating the wheel in a reverse direction to urge the sheet objects from the compartment.

5. The apparatus of claim 1 including a finger disposed on the drum and moveable between an extended and a retracted position, means for extending the finger to the extended position to engage any sheet objects in said chamber and means for rotating the drum in a reverse direction to discharge any sheet objects from the chamber, said extending means retracting the finger from said extended position in response to reverse rotation of the drum to grasp any sheets in said chamber.

6. The apparatus of claim 5 wherein the drum includes a plurality of stacked disks, said finger moveable from the stack for extension and retraction.

7. The apparatus of claim 1 wherein the drum includes a protrusion at its periphery to press any sheet objects in the chamber against the housing.

8. A count and discharge apparatus for a sheet object comprising:

a closed housing having a discharge opening;

a drum disposed in the housing, said drum having (i) a cylindrical outer periphery to define in cooperation with the housing a closed, circumferential, chamber to receive one or more sheet objects and (ii) a circumferential compartment radially inward from the drum periphery, said compartment opening to the periphery and adapted to receive a sheet object;

means for feeding a sheet object into the compartment;

means for counting the sheet object fed into the compartment;

means for rotating the drum the drum in a first direction;

a stop disposed in the housing to engage the sheet object in the compartment when the drum is rotated in the first direction to urge the sheet object from the compartment into the chamber;

a finger disposed on the drum for extension from the periphery thereof; and means for rotating the drum in a reverse, second direction and for extending the finger to engage any sheet objects stored in the chamber and direct them to the discharge opening for removal from the housing.

9. The apparatus of claim 8 further including means to retract the finger to trap an edge of any sheet objects against the periphery of the drum until the sheet objects are pulled from the discharge opening.

10. The apparatus of claim 9 including a controller adapted to control the rotation of the drum in said first and second directions, said controller adapted to rotate the drum in said first direction to return the sheet objects to the chamber if the sheet objects are not pulled from the housing during a first time period.

11. A count and discharge apparatus for a sheet object comprising:

a closed housing having a discharge opening;

a drum disposed in the housing, said drum having (i) a cylindrical outer periphery to define in cooperation with the housing a closed, circumferential, chamber to sequentially receive sheet objects to define a sheet object bundle and (ii) a circumferential compartment radially inward from the drum periphery, said compartment opening to the periphery and adapted to receive a sheet object;

a sheet object feed mechanism adapted to serially remove a sheet object from a sheet objects supply;

means for rotating the drum in the housing in a forward and a reverse direction, said drum in a feed position aligning the compartment to receive a sheet object from the feed mechanism;

a controller adapted to control the rotation of the drum;

means for counting the sheet object fed into the compartment;

a stop disposed in the housing to engage the sheet object in the compartment when the drum is rotated in the first direction to urge the sheet object from the compartment into the chamber, said controller adapted to control the drum to serially receive a sheet object in the compartment from the feed mechanism, rotate the drum in a first direction to deposit the sheet object from the compartment into the chamber and return to said feed position a receive the next sheet object in the compartment to serially deposit a selected number of sheet objects into the chamber to define a sheet object bundle; and means for removing the bundle from the housing means for sensing the feed of a plurality of sheet objects together into the compartment, means for backing the sheet objects from the compartment and means for moving the backed out sheet objects to a collection tray for storage thereof.

12. The apparatus of claim 10 wherein the removing means includes a finger disposed at the periphery of the drum for extension therefrom when said controller controls the drum to rotate in a reverse direction to engage the sheet object bundle and move it from the chamber to the discharge opening.

13. The apparatus of claim 11 further including means for sensing the feed of a plurality of sheet objects together into the compartment, means for backing the sheet objects from the compartment and means for moving the backed out sheet objects to a collection tray for storage thereof.

14. An apparatus for handling sheet-like objects comprising:

a rotatable cylindrical drum having a circumference larger than the length of said sheet objects, said drum having an elongated, circumferential compartment to receive sheet objects fully inserted therein;

a stop at a fixed position relative to the drum to prevent sheet objects in the compartment from rotating with the drum;

a housing disposed about at least part of the drum and spaced therefrom to define a stacking chamber;

a reversible sheet object feed mechanism adapted to send a sheet object into and extract a sheet object from the compartment;

means for rotating the drum in a first direction, said stop urging a sheet object in the compartment from the drum and into the stacking chamber, and for rotating the drum in a second direction for extraction of a sheet from the compartment by said feed mechanism.

15. The apparatus of claim 14 including a finger retractably disposed on the drum and means for extending the finger from the drum into said stacking chamber in response to rotation of the drum in said second direction.

16. The apparatus of claim 13 including means for retracting the finger to capture any sheet in the stacking chamber against the periphery of the drum.

17. The apparatus of claim 12 wherein said drum includes a plurality of axially stacked discs.

18. The apparatus of claim 12 including a protrusion at the exterior of the drum to press sheet objects in the chamber against the housing.

19. The apparatus of claim 12 including a sensor to sense the feed of a sheet object into said compartment.

* * * * *